United States Patent [19]

Ryan

[11] Patent Number: 4,537,149
[45] Date of Patent: Aug. 27, 1985

[54] METHOD AND APPARATUS FOR CLEANING TAINTED SHELLFISH

[76] Inventor: William J. Ryan, 135 Ramble Rd., Staten Island, N.Y. 10308

[21] Appl. No.: 418,057

[22] Filed: Sep. 14, 1982

[51] Int. Cl.³ .............................................. A01K 61/00
[52] U.S. Cl. ........................................................ 119/4
[58] Field of Search ...................................... 119/4, 2, 3

[56]  References Cited

U.S. PATENT DOCUMENTS

| | | | |
|---|---|---|---|
| 463,397 | 11/1891 | Walton, Sr. | 119/4 |
| 3,192,899 | 7/1965 | Lucey et al. | 119/4 |
| 3,418,138 | 12/1968 | Dennis et al. | 119/4 |
| 3,641,982 | 2/1972 | Woodridge et al. | 119/4 |

Primary Examiner—Hugh R. Chamblee

[57]  ABSTRACT

Microbiologically contaminated shellfish are rendered edible by depurating the tainted shellfish in ultraviolet light irradiated salt water. The inlet water is first irradiated with ultraviolet light from an ultraviolet light source immersed in the water. The ultraviolet treated inlet water is then circulated through a filter which is provided to remove solid impurities from the circulating salt water whose salt and oxygen contents, temperature and flow rates are carefully controlled. Before returning to the depurating tank the water is again passed through an ultraviolet light irradiation zone.

6 Claims, 6 Drawing Figures

METHOD AND APPARATUS FOR CLEANING TAINTED SHELLFISH

BACKGROUND OF THE INVENTION

1. Field of Invention

This invention relates to a method of and apparatus for treating contaminated shellfish. More particularly, this invention relates to the microbiological cleansing of contaminated inedible shellfish, such as oysters, clams, and other bivalves, using ultraviolet light irradiated salt water to allow the shellfish to depurate by natural processes.

2. Discussion of the Prior Art

It is known from U.S. Pat. No. 3,418,138 to J. M. Dennis, et al to treat tainted bivalves, especially oysters and clams, by submerging the tainted bivalves in a tank containing moving ultraviolet ray treated salt water for from 1 hour to 336 hours at water temperatures of 34° to 90° F., and causing the water to circulate during this period while subjecting the treated salt water to ultraviolet light. The salt water is treated in an open trough or sluiceway at a depth of 1/16 of an inch to 12 inches and at a flow rate of from 1 to 50 gallons per minute and is then pumped, through a bank of spray nozzles, into the depurating tank.

In U.S. Pat. No. 3,641,982, D. D. Woodridge, et al describe an open end bivalve depuration system in which the salt water is sterilized, e.g. ultraviolet ray treated, before being returned to the source, as well as before contacting the tainted bivalves. The depurating tank described in this patent includes several tiers of removable trays in the tank and three tiers of water pipes with spray nozzles for introducing the ultraviolet ray treated salt water into the tank. Propeller means are also provided to aid in circulating the salt water in the tank.

These prior art methods and apparatus have had only limited success in purifying bivalves removed from polluted water to a sufficient degree to render them fit for human consumption and, therefore, still further improvements and efficiencies in the operation are required. In particular, because of stringent government regulations at the federal, state and local levels regarding the microbiological cleansing of tainted shellfish it is important to provide a system which can consistently guarantee performance meeting these requirements.

SUMMARY OF THE INVENTION

Accordingly, it is an object of the invention to provide a method and apparatus for purifying bivalves which have been collected from polluted water and which are suspected of being contaminated by bacteria, refuse and other impurities, to render the bivalves fit for human consumption.

It is a further object of the present invention to purify tainted shellfish in a speedy and efficient manner by carefully controlling the composition, temperature and flow rate of the salt water in which the tainted bivalves are submerged.

A further object of this invention is to provide shellfish depurating apparatus which is simple to operate and easy to maintain and clean.

A still further object of this invention is to provide apparatus which includes means for filtering out solid contaminants from the salt water used to treat the tainted shellfish and means to control the salt content, dissolved oxygen content, and temperature of the salt water, in addition to first and second ultraviolet light irradiation zones.

Briefly, the present invention provides an improvement in the method for treating bivalve shellfish containing inedible impurities to render the bivalves fit for consumption as food by maintaining the tainted bivalves, while supported in a holding tank, in a quantity of circulating salt water which has been purified with the aid of ultraviolet light irradiation until the impurities have been removed from the bivalves, characterized by circulating salt water which has been treated with ultraviolet light through filter means for removing suspended solid impurities, then through heat exchange means for maintaining the temperature of the circulating water in the range of from about 40° F. to 70° F., through a second ultraviolet light irradiation zone to destroy any remaining bacterial impurities present in the water, through an aeration zone to maintain a dissolved oxygen content in the circulating salt water in the range of from about 5 milligrams to 10 milligrams dissolved oxygen per liter of water, and then to the depurating tank, while maintaining the average salinity of the salt water in the holding tank in the range of from about 18 milligrams to 31 milligrams per kilogram water, the salt water being maintained in the holding tank in an amount sufficient to provide at least 8 gallons of salt water per bushel of the bivalves, and the salt water being circulated at a rate of about 1 gallon per minute per bushel of bivalves in the depurating tank.

The present invention also provides apparatus for microbiologically cleaning (depurating) contaminated bivalve shellfish, such as oysters, clams, mussels, and the like, which includes a holding and depurating tank including first and second pairs of opposed side walls and a bottom wall having an opening at one end thereof; a receptacle below the opening having a bottom wall and first and second pairs of side walls defining an open upper end, and an outlet in one of the side walls; filtering means below the opening in the bottom wall of the holding tank and in the open upper end of the receptacle; an heat exchange zone including a housing and heat exchange means within the housing for controlling the temperature of the water circulating through the apparatus; an ultraviolet light irradiation zone including an ultraviolet light source and an open trough below the ultraviolet light source, the open trough including at its downstream end a spillway extending over one side wall of the holding tank; and means for pumping water from the receptacle to the trough of the ultraviolet light irradiation zone via the heat exchange zone; whereby salt water fed into the holding and depurating tank will pass through the filter means, heat exchange zone and ultraviolet light irradiation zone before being returned to the holding tank by flowing over the spillway, thereby entraining air in the returned purified salt water and promoting the circulation of the purified salt water in the tank for depurating the contaminated shellfish.

The above and other objects of the invention will become more apparent and easily understood by the aid of the following description of specific embodiments and accompanying drawings in which:

DETAILED DESCRIPTION AND PREFERRED EMBODIMENTS

Figure 1:
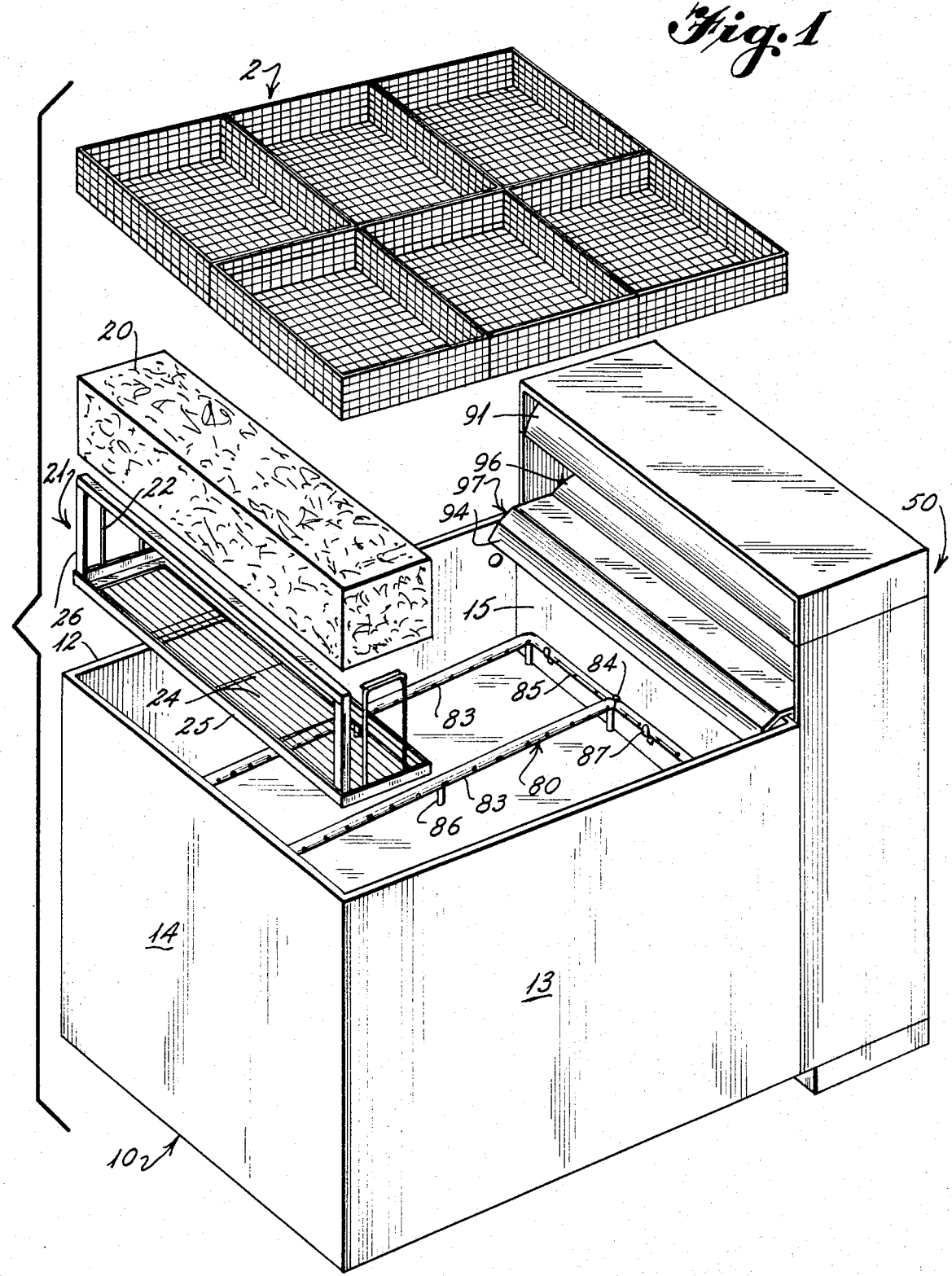
FIG. 1 is an exploded view of the apparatus of the invention.
Figure 2:
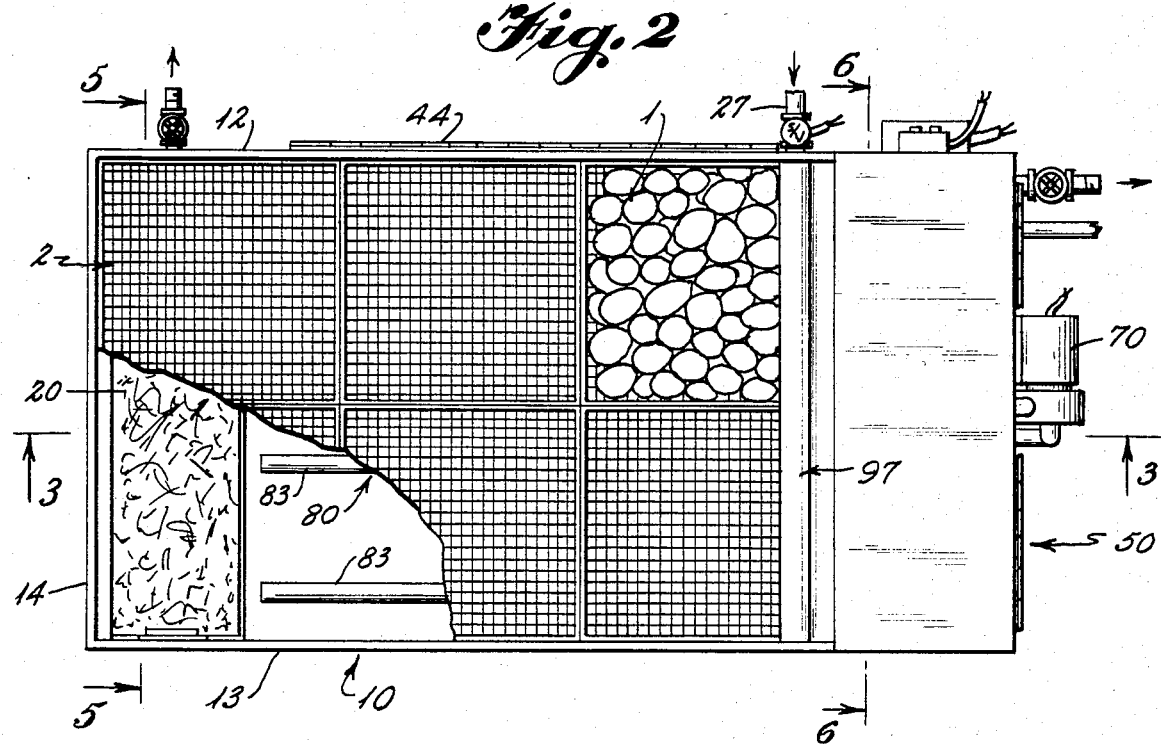
FIG. 2 is a top plan view of the apparatus of FIG. 1.

This invention can be applied to the microbiological cleansing, i.e. depuration, of such tainted shellfish or bivalves as oysters, clams, mussels, scallops, conches and the like which have been harvested from polluted waters such that the shellfish may be contaminated with pathogenic microorganisms, and bacteria, especially coliform bacteria and are, therefore, suspected of being unfit for human consumption. Generally, these shellfish are considered to be nonhazardous for use as food for human consumption when the total fecal coliform MPN per 100 grams of the sample is no more than about 230, preferably, not more than about As used herein "MPN" means most probable number which is an estimate of the number of bacteria per one hundred (100) milliliters or grams of sample using standard laboratory tests and probability tables.

According to the method of this invention, bivalve shellfish containing or suspected of containing hazardous impurities, especially excessive bacteria and other harmful microorganisms, are treated, while supported in a suitable holding tank, with a quantity of circulating salt water which has been treated by irradiation with ultraviolet light rays under temperature, salinity, dissolved oxygen content, flow rate, and total coliform quality for a sufficient period of time to permit the bivalves to depurate, i.e. pump out, from its system the contaminating impurities. The salt water is circulated under conditions which control and maintain its temperature in the range of 40° to 70° F., preferably 50° to 68° F., its salinity in the range of 18 to 31 grams per kilogram water, preferably 20 to 25 g/kg water, its dissolved oxygen content in the range of 5 to 10 milligrams per liter, and its flow rate in the range of 1 to 2 gallons per minute per bushel of shellfish. The salt water is also filtered to remove suspended solid impurities, especially, so that the bivalves are presented with substantially noncontaminated water. The temperature is monitored with a suitable temperature measuring device in the holding tank or in the vicinity thereof and maintained by passing the salt water through or passed heat exchange coils, in or near the holding tank, controlled by the temperature measuring device.

The dissolved oxygen content is maintained by passing the circulated salt water through an aeration zone where the flow path is disturbed to mix air into the water.

It is a feature of the present invention that the circulating salt water is irradiated with ultraviolet light before the water is first introduced into the depurating apparatus and again during each cycle that the water is circulated through the apparatus. In the first ultraviolet light irradiation zone, the incoming salt water, from any suitable source, generally a natural body of salt water in the locale of the plant where the apparatus is set up, flows over an immersion type high power output ultraviolet light source. The first ultraviolet light irradiation zone can, for example, be located upstream of the inlet pipe to one or a plurality of the holding depurating tanks and can serve a single tank or a plurality of tanks, for example, 2 to 20 or more tanks. A suitable immersion type ultraviolet light source is the No. 2300 Ultradynamic full immersion type salt water purification unit available from Ultradynamic Corp., California.

The second ultraviolet light irradiation zone is located immediately before the return of the circulating salt water to the holding and depurating tank and downstream from the salt water filtering zone and heat control zone. The second ultraviolet light irradiation zone can include one or several ultraviolet light sources, preferably three light sources arranged in a row directly over the circulating salt water. Suitable reflectors, for example, a parabolic reflector, are provided to direct the ultraviolet light to the circulating salt water. Any suitable conventional ultraviolet light sources can be used for this purpose.

The microbiologically purified, aerated, ultraviolet treated water is maintained in the holding and depurating tank in a total volume sufficient to provide from about 8 to about 10 gallons of water per bushel of shellfish in the tank.

The method for purifying the tainted shellfish is carried out using the apparatus of this invention which is characterized by a holding and depurating tank having sufficient storage area to allow passage therethrough of at least 8 cubic feet of water per bushel rated capacity of the tank, the tank including first and second pairs of opposed side walls and a bottom wall having an opening at one end thereof, filtering means in the opening and discharging into the open end of a receptacle providing a reservoir for the filtered water, the receptacle having an outlet in one side wall thereof; a conduit connected to the receptacle outlet; pump means for pumping the water from the receptacle, through the conduit to an ultraviolet light irradiation zone which includes an open trough and an ultraviolet light ray source above the trough for further purifying the water, the trough terminating at one end thereof which extends over a side wall of the holding and depurating tank, in a spillway, which provides a source of disturbance of the flow path of the water and thereby functioning as an aeration zone; and a heat exchange zone including heat exchange means for controlling and maintaining the temperature of the water circulating through the apparatus. Accordingly, salt water fed into the holding and depurating tank will pass through the filter means, the heat exchange zone, the ultraviolet light irradiation zone and over the spillway back into the holding and depurating tank. As the water flows over the spillway, sufficient air becomes entrained in the water to maintain the necessary quantity of dissolved oxygen, while also promoting the circulation of water in the tank.

The apparatus will further include a salt measuring device to measure the salinity of the water to allow the shellfish to take advantage of their natural habitat.

Referring to the drawings, the depurating apparatus includes a main housing unit 10, a filter 20, filter holder 21, salt water treating unit 50, and cleaning pipes 80. The main housing unit includes in its upper portion the holding and depurating tank 11 and in the lower portion a filtered water receptacle 30 at one end under filter 20, and empty space 41 at the other end of the lower portion.

Figure 3:
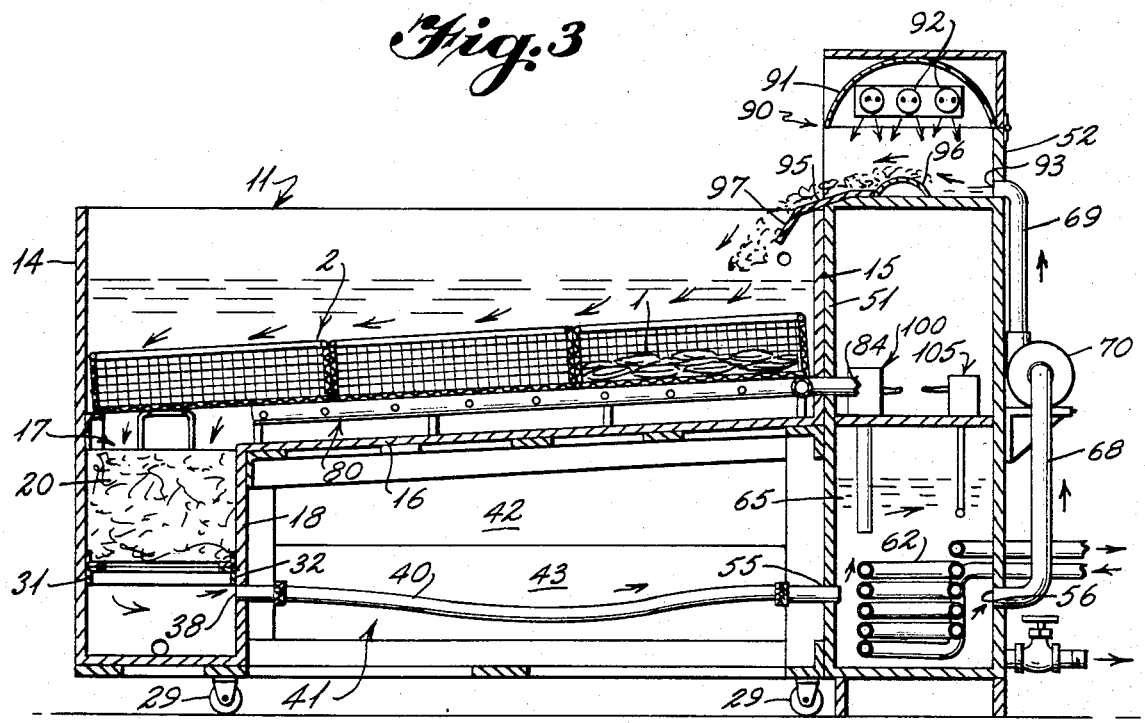
FIG. 3 is a side-elevational view along line 3—3 of FIG. 2.
Figure 4:
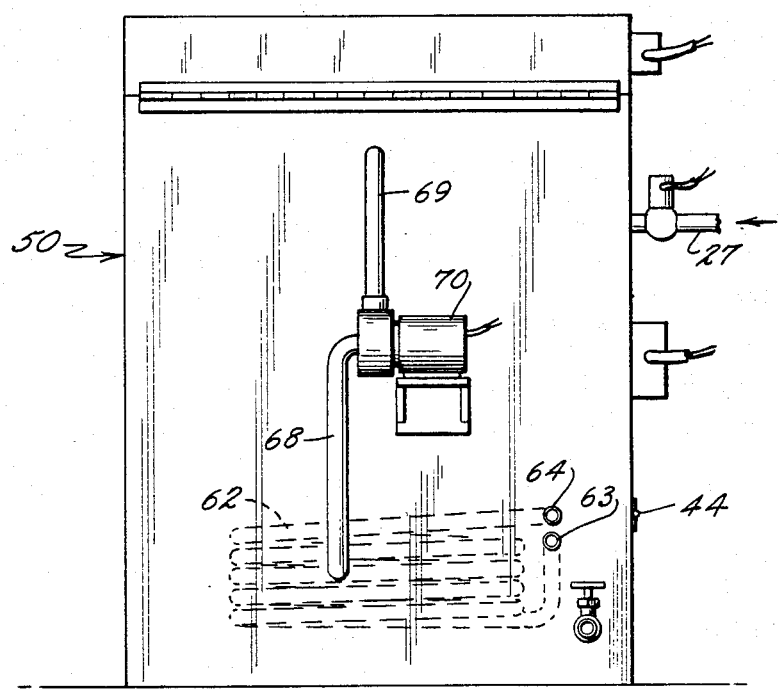
FIG. 4 is an end view of the apparatus of FIG. 3 viewed from the right end.
Figure 5:
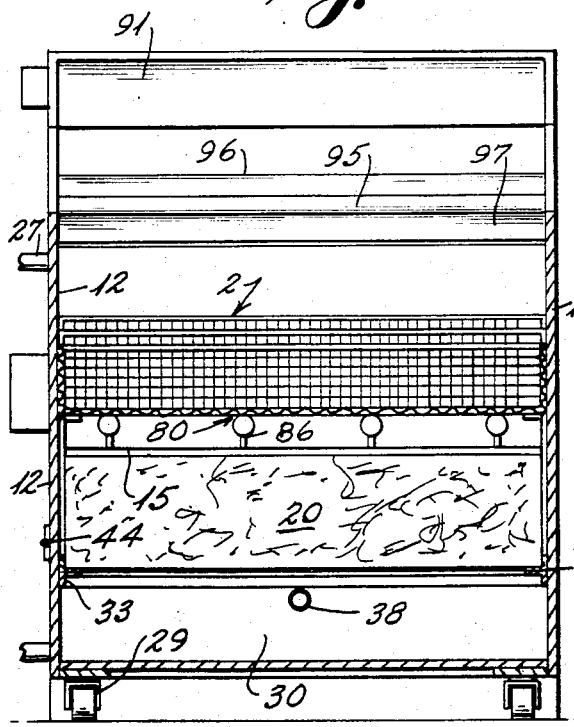
FIG. 5 is a view in the direction of arrows 5—5 of FIG. 2.
Figure 6:
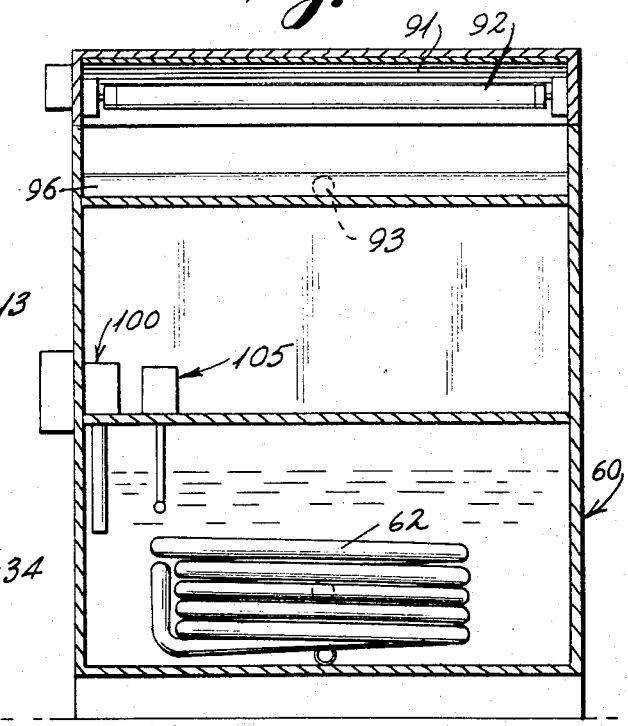
FIG. 6 is a view in the direction of arrows 6—6 of FIG. 2.

The holding and depurating tank 11 includes first pair of side walls 12 and 13 and a second pair of opposed end walls 14 and 15, each pair of walls extending upwardly from bottom wall or floor 16. Floor 17 ends short of end wall 14 to form an opening 17 at one end of the floor. As shown in FIG. 3, floor 16 slopes downwardly from side wall 15 to side wall 14, i.e. the end containing opening 17, to facilitate flow of water in the tank towards the opening and also prevent formation of stagnant water zones or pockets in the tank.

Receptacle 30 is located directly below opening 17 and is defined on three sides by the lower portions of walls 12, 13 and 14 and on the fourth side by wall 18, the upper end of which joins the free end edge of floor 17, all four walls being joined at their base by bottom wall or floor 19.

Filter 20 and its holder 21 fit tightly between side walls 12 and 13 and end walls 14 and 18 of the receptacle 30 below opening 17. As shown in FIG. 3, the upper surface of filter 20 lies slightly below floor 16 and opening 17 when the filter and its holder are fully inserted into the receptacle to rest on brackets 31, 32 mounted on walls 14 and 18, respectively, and brackets 33, 34 mounted on walls 12 and 13, respectively. Accordingly, all of the salt water in tank 11 will pass through filter 20 into receptacle 30 which provides a reservoir 36 for the filtered water. Any filtering means which is capable of removing suspended solid matter, present in the salt water can be used. An example of a suitable filtering material is a spun fiber glass batt type filter capable of removing suspended matter as small as 3 to 5 microns. This material is inert to the salt water, so that it will not be corroded and will not be degraded during use for extended periods. The filter should be easily removable for replacement or cleaning after each depurating cycle and when its filtering capacity has been reached. For this purpose, filter holder 21 is provided with handles 22, 23 at either end of its open meshed or grid base 24 supported by rectangular frame 25. Vertical frame member 26 is also provided on at least one side of base 24 to provide additional structural support and also to serve as a support for the shellfish holding basket or baskets located over opening 17. Handles 22 and 23 provide additional support for the shellfish holding baskets as seen in FIG. 3.

An outlet opening 38 is provided in side wall 18 below filter 20 and below the water line of reservoir 34. A flexible hose 40 is removably connected at one end thereof to opening 38. The flexible hose is contained within empty space 41 in the lower portion of main housing unit 10. Access to hose 40 is provided through side wall 12 which includes an upper door portion 42 hinged at 44 to lower door portion 43.

The other end of flexible hose 40 is removably connected to inlet opening 55 in the lower portion of side wall 51 of salt water treating unit 50 which, as shown, is separate from and abuts against main housing unit 10. Flexible hose 40 provides a conduit through which the filtered salt water in reservoir 34 is transported by suction pump 70 to a heat exchange zone 60 housed in receptacle 61 in the lower portion of unit 40. Heat exchange zone 60 includes heat exchange coils 62 having an inlet 63 and outlet 64 for heating or cooling medium from suitable sources of, for example, steam and ice water, respectively, (now shown).

Salt water treating unit 50 also houses at the upper end thereof an ultraviolet light irradiation and aeration zone 90 which includes a bank of three ultraviolet lamps 92 within a parabolic reflector 91 overlying trough 95 through which salt water flows as described below.

Pump 70 transports the salt water, at a rate of from about 1 gallon to 2 gallons per minute, preferably from about 1 to about 1.5 gallons per minute, from the heat exchange zone outlet opening 56 in the lower portion of side wall 52 to the ultraviolet light irradiation and aeration zone 90 through opening 96 in the upper portion of side wall 52, via conduits 68 and 69, respectively, at the suction and output sides of pump 70. Salt water flows from the outlet of conduit 69 through opening 93 into the trough 94. Spillway 95 at the open downstream end of trough 94 includes a weir 96 and lip 97 extending over end wall 15 to create an aeration zone which allows air to be entrained in the water spilling over lip 95 into tank 11.

As the salt water flows through trough 91, it is irradiated by ultraviolet lamps 92 for sterilizing the salt water before it recirculates back into tank 10.

A temperature sensing device 100 is provided with its probe extending into reservoir 65 to measure the temperature of the circulating water and control the operation of the heat exchanger in response to the measured temperature. The temperature sensing device is preset to maintain a water temperature in the range of 40° to 70° F.

A salinity measuring unit 105, e.g. a hydrometer, is also provided to measure the average salt content, e.g. as a function of density, of the circulating water in tank 11. If the measured average salt content is too high, which is rarely the case, an appropriate amount of fresh tap water can be mixed with the salt water until the desired concentration is obtained, for example through inlet 19. If the salt content is too low, additional salt can be added. Preferably dry granular sea salt is used for this purpose and is manually added to the water in tank 11. The average salt content should be selected to closely reproduce the natural environment of the shellfish in order to promote the natural pumping action of these bivalves. Salt contents in the range of from about 18 to about 31 mg per kg water, especially from about 20 mg/kg to 25 mg/kg is preferred.

In operation, tank 11 is filled with sea water from an acceptable source or with artificial sea water to a sufficient height, e.g. 15 inches, to fully submerge the tainted shellfish which will be treated in the tank. The water can be introduced into the tank by inlet pipe 27 and inlet opening 28 in the upper portion of side wall 12.

When using natural salt water or artificially prepared salt water from a source of water of doubtful microbiological purity, the incoming water is pretreated, downstream of inlet opening 28, with a source of ultraviolet light rays (not shown), preferably a full immersion type salt water purification unit, such as is available from Ultradynamics Corp. as model number 2300. A separate unit can be provided for this purpose which has sufficient capacity to sterilize inlet water for a plurality of depurating tanks.

The salt water is allowed to make one complete cycle through filter 20, heat exchange zone 60, and ultraviolet light irradiation and aeration zone 90 before returning to tank 10 from trough 94. During the first cycle, the salinity, dissolved oxygen content and temperature are measured and adjusted, as necessary, to conform to the above specified values.

The tainted shellfish 1 are then placed into the tank in one or more open mesh baskets 2 which allows the water in the tank to circulate completely over and through the shellfish in the baskets from all directions. In this regard, the bottom of each basket should be at least about one and one-half inches off the floor of the tank.

The spacing of the baskets from the tank floor is conveniently accomplished according to the invention by providing a plurality of spaced apart high water pressure cleaning pipes 80 along the floor of the holding and depurating tank. The baskets can then be supported on these pipes and also by the filter holder 21 as previously described.

The suction pump is adjusted to circulate the salt water at a rate of about 1 to 2 gallons per minute through the tank and the circulation is continued for at least 48 hours until the shellfish become nonhazardous for consumption as food.

At the end of the depuration cycle, the salt water is removed from tank 11 and receptacles 30 and 61 through drain valves 35 and 65 located in receptacles 30 and 61, respectively. The floor 17 of tank 11 is then thoroughly cleaned of accumulated debris using high pressure water sprayed onto the floor and lower wall portions beneath the baskets holding the shellfish using pressure cleaning pipes 80. Pipes 80 are actuated by a by-pass valve 81 connected to a filler connection 82 at the rear of the heat exchange receptacle 61. Four apertured pipes 83 are fed with the high pressure water from a source (not shown) through conduit 84 and apertured manifold pipe 85. The pipes can be spaced from the floor 17 by legs 86 and can also optionally be secured by hooks 87 to end wall 15.

The entire high pressure cleaning system is removable from tank 11 by disconnecting conduit 84 from a quick-slip hose coupling connection 82. The pipes 83 and 85 can then be cleaned outside of the tank of any finely divided accumulated debris which may clog the apertures.

Filter 20 can also be removed and back-flushed or replaced at the end of a cleaning cycle. The entire tank will then be hosed down to further assure the cleanliness of the apparatus before it is used for another depuration cycle.

Furthermore, main housing unit 10 is provided with wheels so that it may be rolled away from salt water treating unit 50 and replaced with a clean unit while the dirty unit is being cleaned.

What is claimed is:

1. In a method for treating bivalves containing inedible impurities to render the bivalves of edible quality by maintaining the tainted bivalves while supported in a holding tank in a quantity of circulating salt water which has been purified with the aid of ultraviolet light irradiation until the impurities have been removed from the bivalves, the improvement which comprises circulating salt water from said holding tank through filter means for removing suspended solid impurities, then through heat exchange means for maintaining the temperature of said circulating water in the range of from about 40° to 70° F., through an ultraviolet light irradiation zone to destroy bacterial impurities present in said water, through an aeration zone to maintain an oxygen content in said circulating salt water in the range of from about 5 to about 10 milligrams dissolved oxygen per liter salt water, and back to said holding tank, while maintaining the average salinity of said salt water in said holding tank in the range of from about 18 to about 31 mg salt per kg water, said salt water being maintained in said holding tank in an amount sufficient to provide at least about 8 gallons of salt water per bushel of said bivalves, and said salt water being circulated at a rate of from about 1 to about 2 gallons per minute.

2. Apparatus for depurating contaminated shellfish such as oysters, clams, mussels, and the like, comprising a holding and depurating tank, including first and second pairs of opposed side walls and a bottom wall having an opening at one end thereof, a receptacle below said opening having a bottom wall and first and second pairs of side walls defining an open upper end, and an outlet in one of said side walls;

filtering means below said opening in the bottom wall of said holding tank and in the open upper end of said receptacle;

an heat exchange zone including a housing and heat exchange means within said housing for controlling the temperature of the salt water from a valve 40° to 70° F., while circulating through the apparatus;

an ultraviolet light irradiation zone including an ultraviolet light source and trough below the ultraviolet light source, the open trough including at its downstream end a spillway extending over one side wall to the holding tank; and means for pumping water at a rate of about one and two gals. per minute, per bushel from the receptacle to the trough of the ultraviolet light irradiation zone via the heat exchange zone;

a salt measuring device whereby the salinity content can be maintained from about 5–31 mgms. per/kg of water;

whereby salt water fed into said holding and depurating tank will pass through said filter means, said heat exchange zone, and said ultraviolet light irradiation zone before being returned to said holding tank by flowing over said spillway thereby entraining air in said returned purified salt water and promoting the circulation of the purified salt water in said tank for depuration of said contaminated shellfish.

3. The apparatus of claim 2 wherein said spillway comprises a weir and a lip downstream of said weir and extending over a side wall of said holding tank whereby salt water in said trough flows over said weir and over said lip into said holding tank.

4. The apparatus of claim 2 further including temperature sensing means for measuring the temperature of salt water in said apparatus and for controlling said heat exchange means in response to the measured temperature.

5. The apparatus of claim 2 further including means for cleaning the bottom wall of said holding tank comprising a plurality of perforated pipes connected to a source of high pressure water, said perforated pipes being located along the bottom wall of said holding tank and being removable from said holding tank.

6. The apparatus of claim 2 further comprising inlet means for introducing salt water into said apparatus and a full immersion salt water purification ultraviolet light source downstream of the inlet means for sterilizing the salt water fed into said apparatus.

* * * * *